(12) United States Patent
Gauria

(10) Patent No.: US 7,571,281 B1
(45) Date of Patent: Aug. 4, 2009

(54) LOOK-UP FILTER STRUCTURES, SYSTEMS AND METHODS FOR FILTERING ACCESSES TO A POOL OF TAGS FOR CACHE MEMORIES

(75) Inventor: Sameer M. Gauria, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 343 days.

(21) Appl. No.: 11/445,658

(22) Filed: Jun. 2, 2006

(51) Int. Cl.
*G06F 13/00* (2006.01)

(52) U.S. Cl. .................. 711/118; 711/131; 711/220
(58) Field of Classification Search ............. 711/118, 711/131, 220
See application file for complete search history.

(56) References Cited

U.S. PATENT DOCUMENTS 5,854,637 A * 12/1998 Sturges ................. 345/542
2004/0243764 A1* 12/2004 Miller .................... 711/118

* cited by examiner

*Primary Examiner*—Sanjiv Shah
*Assistant Examiner*—Jae U Yu
(74) *Attorney, Agent, or Firm*—Cooley Godward Kronish LLP

(57) ABSTRACT

In one embodiment, an apparatus includes an input port to receive a request to determine whether data units are stored in the cache, as well as an output port to generate look-ups for the pool of tags. The apparatus also includes a look-up filter coupled to the input and output ports, and operates to filter out superfluous look-ups for the data units, thereby forming filtered look-ups. Advantageously, the look-up filter can filter out superfluous look-ups to at least reduce the quantity of look-up operations associated with the request, thereby reducing stalling associated with multiple look-up operations. In a specific embodiment, the look-up filter can include a data unit grouping detector and a look-up suppressor.

10 Claims, 5 Drawing Sheets

LOOK-UP FILTER STRUCTURES, SYSTEMS AND METHODS FOR FILTERING ACCESSES TO A POOL OF TAGS FOR CACHE MEMORIES

BRIEF DESCRIPTION OF THE INVENTION

This invention relates generally to computing devices and cache memories, and more particularly, to an apparatus, system and method for filtering look-ups to a repository of tags.

BACKGROUND OF THE INVENTION

A cache is a temporary storage facility for storing copies of data that can be accessed faster than from the originating source, such as a system memory. A cache contains a number of cachelines containing units of data, as well as a number of tags referencing the data in the cachelines. To determine whether there is a "cache hit" or a "cache miss," a cache memory system performs a look-up operation to match addresses constituting a request for data against the contents of the repository of tags. In ordinary cache memory systems, the repository of tags can service only a limited number of tag look-ups per look-up operation.

A drawback to this approach is that when the number of addresses requested exceeds the number of tag look-ups per look-up operation, then multiple look-up operations are generally required to determine whether each of the requested data units reside in the cache. To illustrate, consider that a request includes six addresses and a look-up operation requires one clock cycle to look up three tags. To ascertain whether the data corresponding to the six addresses reside in the cache, conventional cache memory systems distribute the six addresses over two look-up operations (i.e., three addresses per look-up operation). But by distributing addresses over multiple look-up operations, the determination whether there are hits or misses for the request stalls until all the addresses are looked up, thereby degrading the performance of the cache memory system as well as the computing device in which the cache memory system operates.

In view of the foregoing, it would be desirable to provide an apparatus, a system, a method, a graphics processing unit ("GPU"), a computer device, and a computer medium that minimize the above-mentioned drawbacks, thereby implementing a look-up filter to filter superfluous look-ups to reduce stalling in look-up operations.

SUMMARY OF THE INVENTION

Disclosed are an apparatus, a system, a method, a graphics processing unit ("GPU"), a computer device, and a computer medium for filtering accesses to a pool of tags indexed into a cache to, among other things, reduce stalling in tag look-up operations. In one embodiment, an apparatus includes an input port to receive a request to determine whether data units are stored in the cache, as well as an output port to generate look-ups for the pool of tags. The apparatus also includes a look-up filter coupled to the input and output ports, and operates to filter out superfluous look-ups for the data units, thereby forming filtered look-ups. Advantageously, the look-up filter filters out superfluous look-ups to reduce the quantity of look-ups associated with the request, thereby establishing a quantity of filtered look-ups that conform with a number of look-ups that can be applied to the pool of tags, for example, per unit of time or in one look-up operation, or both. In some cases, the quantity of the filtered look-ups is the same or fewer than the number of look-ups implemented per look-up operation, which can reduce the amount of time to determine whether the requested data units are stored within the cache than if the request requires multiple units of time or multiple look-up operations. In a specific embodiment, the look-up filter can include a data unit grouping detector and a look-up suppressor. The data unit grouping detector can operate to identify multiple data units as identified multiple data units, each of which is indexed by a tag residing in the pool of tags. The look-up suppressor can operate to prevent a superfluous look-up into the pool of tags for a data unit of the identified multiple data units.

In one embodiment, a method filters accesses to a pool of tags indexed into a cache. The method can include filtering tags associated with a request for data units to form filtered tags, and applying the filtered tags to the pool of the tags during a look-up operation to determine whether each of the data units is stored in the cache. In one embodiment, the selection of the filtered tags can include determining one or more tags for each subset of addresses in the request, and selecting one tag from the one or more tags as one of the filtered tags to reference a corresponding cacheline.

In an alternate embodiment, a processor with a graphics pipeline uses a look-up filter to produce computer-generated images. Such a processor can include a frame buffer memory for maintaining vertex attribute data for vertices, a cache memory for storing the vertex attribute data in cachelines, a pool of tags that reference the cachelines, and a look-up filter configured to filter out superfluous look-up tags for the vertex attribute data, thereby forming filtered look-up tags.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
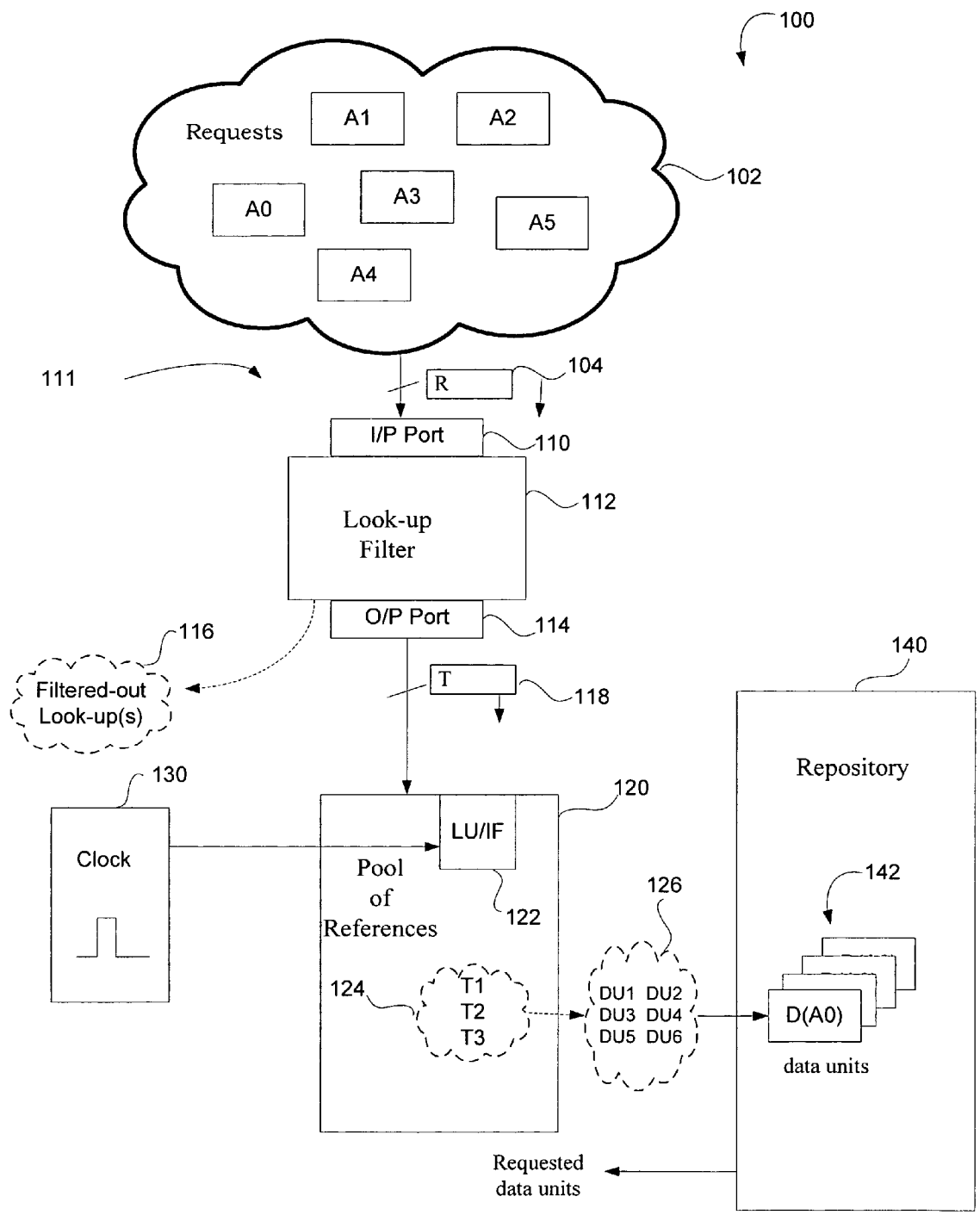
FIG. 1 is a block diagram of an apparatus for filtering superfluous tags, according to at least one specific embodiment of the invention.

FIG. 1 is a block diagram 100 showing at least a portion of an apparatus that filters accesses to a pool of tags indexed into a cache, according to at least one specific embodiment of the invention. In the example shown, a look-up filter 112 is disposed within a request stream 111, which includes requests 102. These requests 102 can specify addresses (e.g., addresses A0, A1, etc.) for accessing data units 142 contained in a cache ("repository") 140. Look-up filter 112 includes an input port ("I/P Port") 110 for receiving a request ("R") 104 that includes a quantity of look-ups based on a specific number of addresses. Look-up filter 112 filters out superfluous look-ups ("filtered-out look-up(s)") 116 to form a quantity of filtered look-ups ("T") 118 at an output port ("O/P Port") 114. In some embodiments, the term "superfluous look-up" generally refers to any look-up that is in excess of what is sufficient to satisfy request 104. As used herein, the term "look-up" refers generally in some embodiments to the action of determining whether address bits from one address in request 104 matches any tag in a pool of tags 120, whereas a "look-up operation" refers generally to the action of determining whether address bits from multiple addresses in request 104 match multiple tags.

Advantageously, look-up filter 112 operates to reduce stalling associated with conventional look-up operations. In particular, look-up filter 112 filters the quantity of look-ups associated with request 104. By filtering out superfluous look-ups, look-up filter 112 establishes a quantity of filtered look-ups 118 that conforms with a number of look-ups that can be applied to a pool of tags 120 in either one look-up operation or per unit of time, or both. In one embodiment, the quantity of the filtered look-ups 118 is the same or fewer than the number of look-ups that can be applied to pool of tags 120. Advantageously, this can reduce the amount of time necessary to determine whether data units 142 are stored within cache 140 than if request 104 required multiple units of time or multiple look-up operations, both of which can stall data retrieval. As such, look-up filter 112 enhances performance for memory systems and/or processors with which it is implemented.

To illustrate the various advantages of look-up filter 112 and other aspects of the embodiments of the invention, consider that a look-up interface ("LU I/F") circuit 122 generally constrains the number of look-ups that can be applied to pool of tags 120 during a look-up operation. Look-up interface circuit 122 operates in synchronicity with a clock 130 to examine "x" number of tags in pool of tags 120 during one unit of time, such as one clock cycle. If look-up interface circuit 122 limits the rate at which look-ups can be applied to pool of tags 120, such as three look-ups per unit of time, then look-up interface circuit 122 becomes a bottleneck when request 104 includes four or more addresses. This is because look-ups in excess of three ordinarily requires multiple units of time or multiple look-up operations. So if request 104 includes six addresses, then two look-up operations (i.e., three look-ups per look-up operation) are necessary when look-up filter 112 is absent. But when look-up filter 112 is present, it can filter out three or more superfluous look-ups 116 to produce three filtered look-ups 118, which conform to the processing abilities of look-up interface circuit 122 per unit time. As such, look-up filter 112 can produce three filtered look-ups ("T1, T2, and T3") 124 to sufficiently detect—in one unit of time—the presence of six data units ("DU1, DU2, . . . , DU6") 126 in cache 140.

Figure 2:
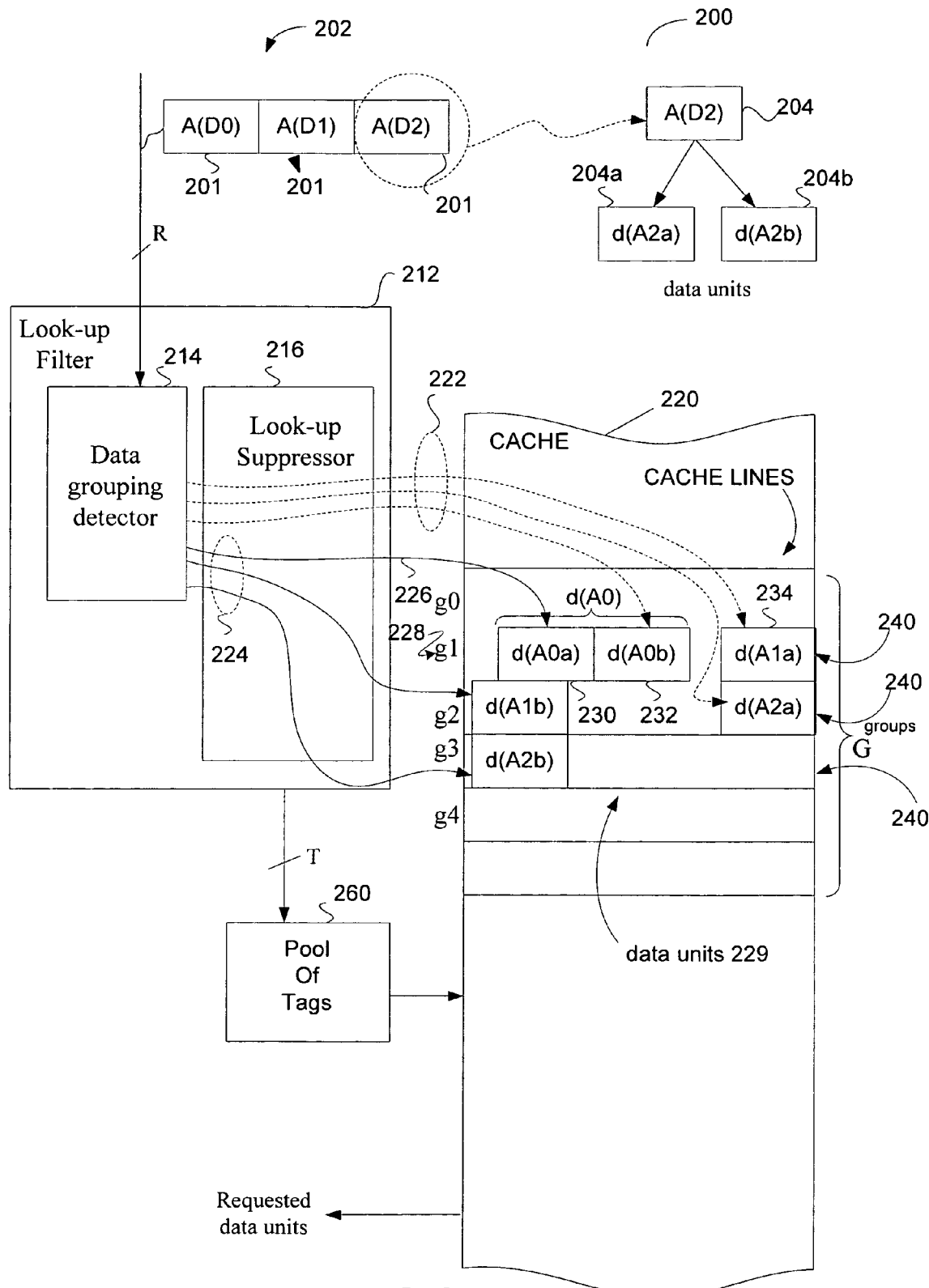
FIG. 2 is a block diagram of a look-up filter, according to at least one specific embodiment of the invention.

FIG. 2 is a block diagram of a look-up filter, according to at least one specific embodiment of the invention. In diagram 200, a look-up filter 212 operates to filter out superfluous look-ups prior to application to a pool of tags 260. In this instance, the term "superfluous look-up" generally refers to a redundant look-up for a tag referring to one group of data units 229 residing in cache 220. So given a redundant group of look-ups, at least one tag is sufficient to perform a look-up into pool of tags 260 for testing the presence of the data units within the specific group of data units 229. Consequently, look-up filter 212 can filter out all but one reference to the specific group, thereby eliminating superfluous look-ups. In some embodiments, any one group of data units 229 is a common cacheline 240.

Look-up filter 212 includes a data grouping detector 214 and a look-up suppressor 216. Data grouping detector 214 is configured to receive a request 202 including addresses 201 for accessing data, such as addresses A(D0), A(D1), and A(D2). The data can be divided into any number of units of data for storage in cache 220. In this case, the data are divided into two data units, both of which are uniquely addressable by a tag. For example, address A(D2) 204 can span a cacheline boundary, thereby causing data for address 204 to span multiple cachelines as data units. As such, one cacheline can contain data unit ("d(A2a)") 204a and another cacheline can contain data unit ("d(A2b)") 204b. Note that data units 204a and 204b are generally adjacent to each other without data from other addresses intervening between the data units.

In operation, data grouping detector 214 detects look-ups referencing data units sharing the same cacheline 240. For example, data grouping detector 214 detects a common grouping ("g1") 228 that multiple data units ("d(A0a)") 230, ("d(A0b)") 232, and ("d(A1a)") 234 share. In some cases, data grouping detector 214 identifies look-ups referencing a common tag in pool of tags 260 that is indexed to multiple data units. In other cases, data grouping detector 214 transmits control information indicative of which tags share a common cacheline 240 to look-up suppressor 216. Regardless, look-up suppressor 216 operates to select a common reference to multiple data units 230, 232, and 234, and then filters out other references to the same cacheline. For example, look-up suppressor 216 retains a look-up 226 for a tag referencing data unit 230, but suppresses or filters out look-ups to other tags in pool of tags 260 that reference data units 232 and 234. Accordingly, look-up suppressor 216 filters out superfluous looks ups 222 and forms filtered look-ups 224, each of which references a different group, such as a different cacheline. Note that in this example data units ("d(A0a)") 230 and ("d(A0b)") 232 constitute data for A(D0), with both data units residing in a common cacheline. They are shown as separate data units for illustration purposes to suggest that they can span multiple cachelines, and thus, may require multiple look-ups.

Figure 3:
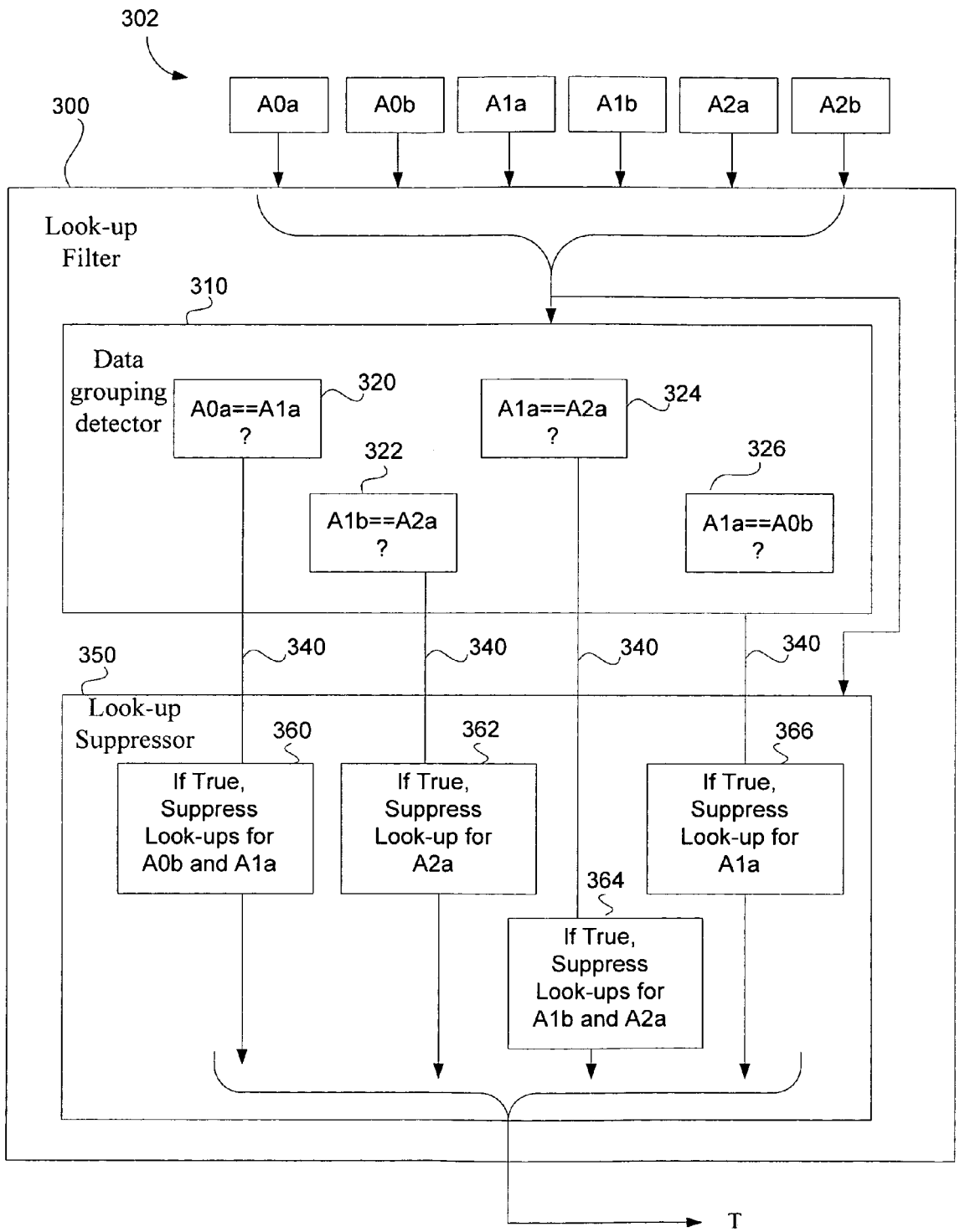
FIG. 3 is a block diagram depicting one example of a look-up filter, according to at least one specific embodiment of the invention.

FIG. 3 is a block diagram depicting one example of a look-up filter, according to at least one specific embodiment of the invention. Look-up filter 300 includes a data grouping detector 310 and a look-up suppressor 350. Look-up filter 300 is configured to receive a request 302 including addresses for data units A0a to A2b (note: the notation d(*) to indicate a data unit has been dropped in this discussion). In this example, data grouping detector 310 is adapted to leverage the nature in which data units A0a to A2b are stored in a cache (not shown). In particular, data grouping detector 310 is configured to examine addresses (e.g., A0a to A2b) that are generally stored consecutively in time and/or memory locations of a cache.

Data grouping detector 310 includes a number of comparators 320, 322, 324, and 326 to determine whether one or more look-ups relate to a common cacheline. These comparators operate to compare address bits of tags associated with data units to match the same address bits. A match identifies at least one tag as a reference for each of the multiple data units in a common cache line. The comparators in this example generate control information 340 indicative of whether two or more data units share a common cacheline, and they also provide this information to look-up suppressor 350. Advantageously, data grouping detector 310 includes fewer comparators than otherwise required if data grouping detector 310 did not rely on data units A0a to A2b being consecutively stored.

Look-up suppressor 350 includes suppressor operations 360, 362, 364, and 366 each receiving control information 340 to select one tag for a look-up and to filter out other look-ups to the common cacheline. For example, consider that comparators 320 and 324 detect a common cacheline. That is, address bits of A0a are the same as address bits for A1a, which, in turn, are the same for A2a. As such, A0a, A1a, and A2a refer to data units sharing a common cacheline. Next, suppressor operations 360 and 364 receive control information 340 from comparators 320 and 324, respectively. From this information, look-up suppressor 350 determines that since A0a, A1a, and A2a refer to data units sharing a common cacheline, then intervening references to A0b and A1b also share the common cacheline. In addition, look-up suppressor 350 selects one tag, such as a tag referencing data unit A0a, to reference the common cacheline. In some embodiments, the address bits for a selected tag form a filtered look-up. Look-up suppressor 350 also suppresses or filters out look-ups associated with A0b, A1a, A1b, and A2b as look-ups relating to these data units would be superfluous. Note that while data grouping detector 310 includes four comparators for looking up six addresses in a pool of tags per look-up operation, any number of comparators can be used for any number of addresses per look-up operation.

Figure 4:
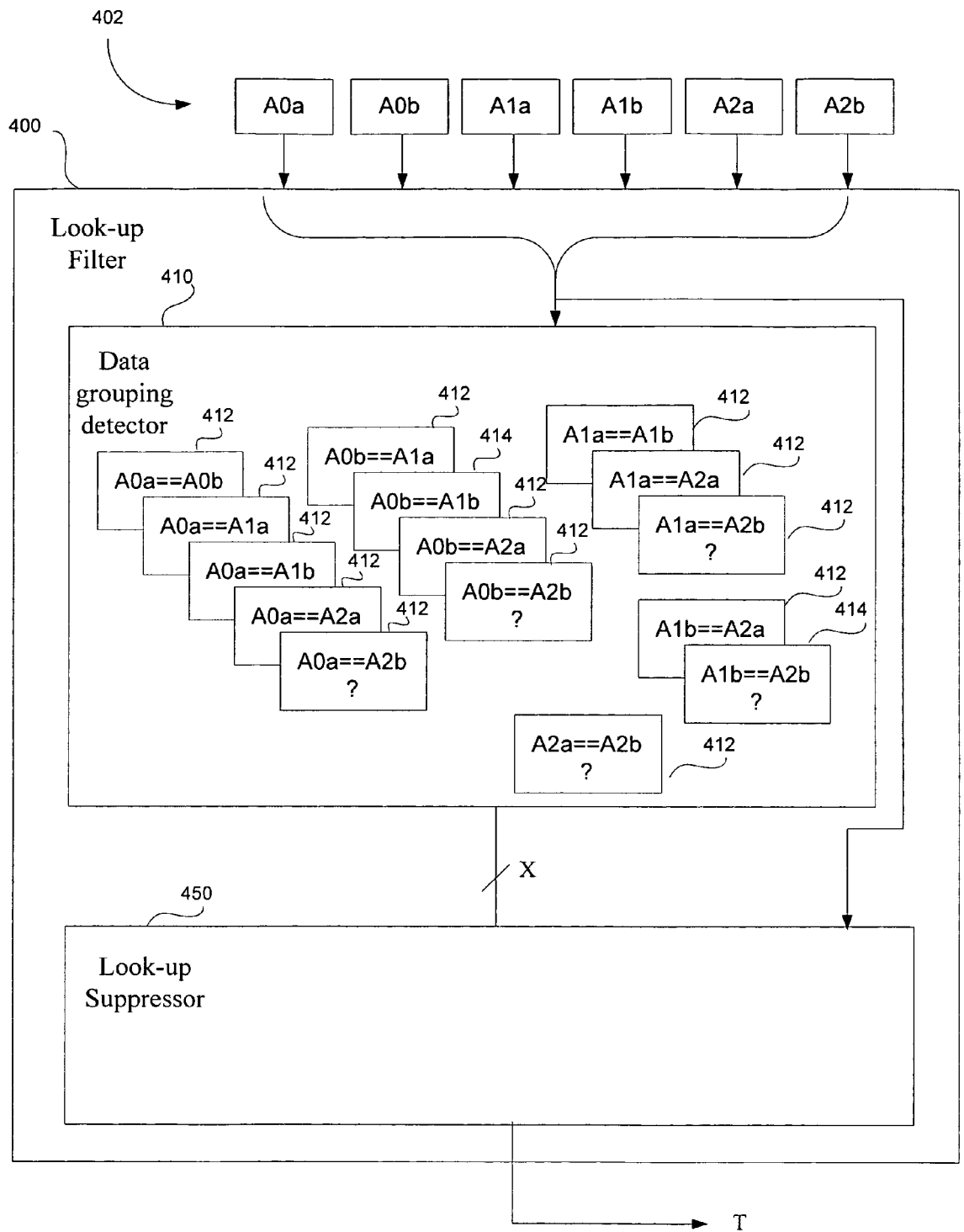
FIG. 4 is a block diagram depicting another example of a look-up filter, according to a specific embodiment of the invention.

FIG. 4 is a block diagram depicting another example of a look-up filter, according to a specific embodiment of the invention. Look-up filter 400 includes a data grouping detector 410 and a look-up suppressor 450. Look-up filter 400 is configured to receive addresses for data units A0a to A2b, all of which constitute a request 402. But in this example, data grouping detector 410 is configured to examine request 402 that references data units that are arbitrarily stored in a cache. That is, data units A0a to A2b need not be stored in a substantially consecutive manner. As such, data grouping detector 410 includes a number of comparators 412 and 414 to determine whether one or more look-ups relate to a common cacheline. As is shown, the number of comparators for arbitrarily-stored data units is generally greater than consecutively-stored data units. In some cases, comparators 414 are absent.

Figure 5:
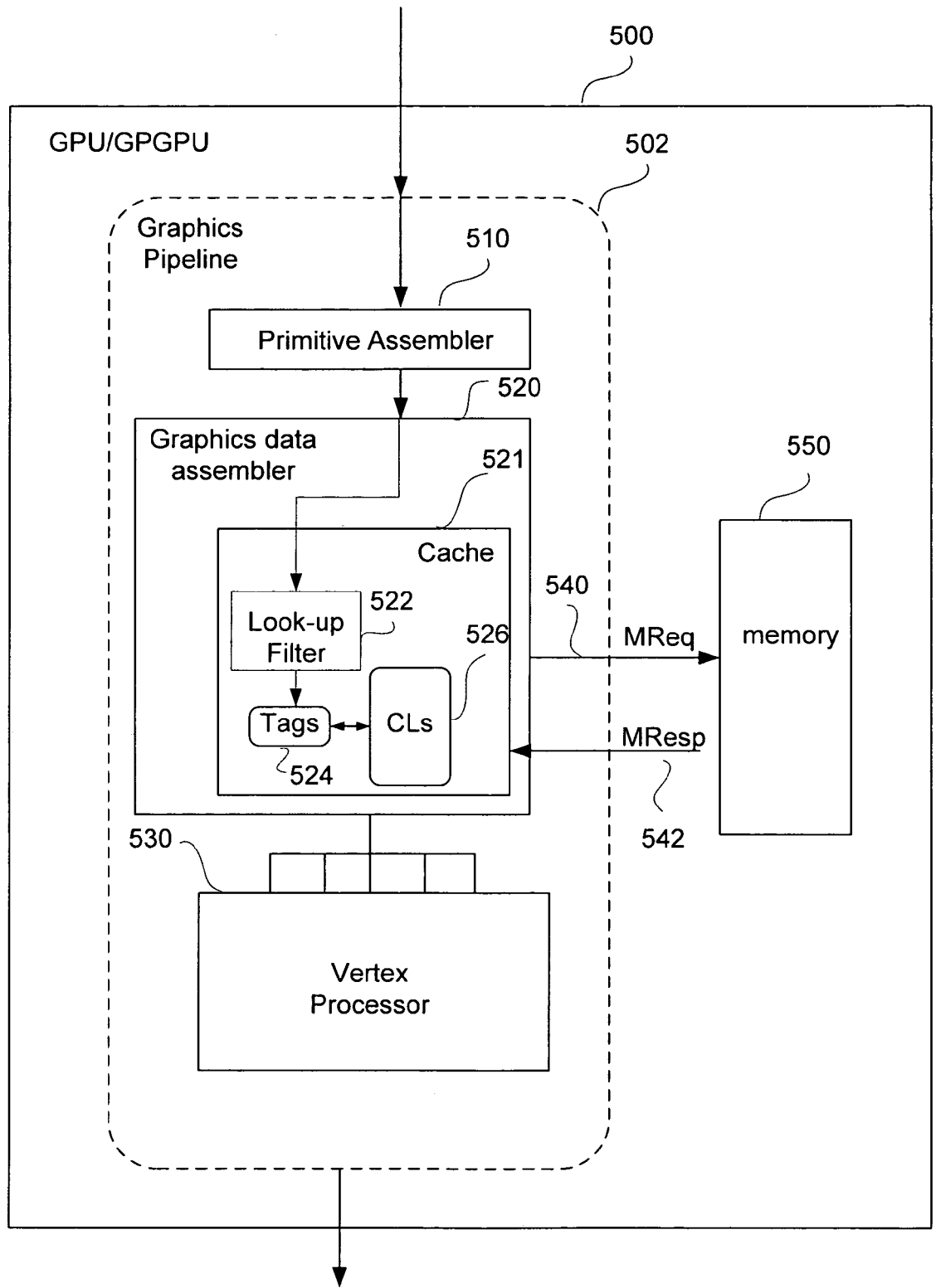
FIG. 5 illustrates an example of a graphics processing unit ("GPU") implementing a look-up filter in accordance with an embodiment of the invention.

FIG. 5 illustrates an example of a graphics processing unit ("GPU") implementing a look-up filter 522 in accordance with an embodiment of the invention. In this example, GPU 500, which can be a general purpose GPU ("GPGPU"), includes a graphics pipeline 502 for rendering images through various graphics operations, such as geometric transformations, clipping, lighting, scaling and the like. Graphics pipeline 502 includes a primitive assembler 510 for assembling primitives. In addition, graphics pipeline 502 can include a graphics data assembler 520 for fetching—at least in part—vertex attributes from a memory 550, which can be a frame buffer. Further, graphics pipeline 502 can include a vertex processor (or shader) 530 to perform parallel processing by a number of parallel processors that process each type of attribute. Each of the parallel processes is associated with one of the parallel data streams produced by graphics data assembler 520. Note that vertex processor 530 need not be limited to performing only parallel processing.

Graphics data assembler 520 includes cache 521 for temporarily storing vertex attributes. In one embodiment, cache 521 can include—in whole or in part—look-up filter 522, a tag repository ("tags") 524 for maintaining tags and a cacheline repository ("CLs") 526 for maintaining data units in cachelines. In operation, look-up filter 522 filters out superfluous look-ups and their associated tags so that graphics data assembler 520 can compare a reduced amount of filtered look-ups against a pool of tags in tag repository 524. These filtered look-ups include addresses that relate to the memory locations for memory 550. If there is a cache hit, vertex information is fetched from one or more cachelines in cache repository 526. Otherwise, if there is a cache miss, then a memory request ("MReq") 540 is directed to memory 550 to fetch data as a memory response ("MResp") 542. Advantageously, the look-up filter 522 can avoid stalls by speeding up detection of data units in cacheline repository 526 that contain requested vertex information. So, for example, if it takes one clock cycle to apply three look-ups to tag repository 624, and if there are six addresses in the request, look-up filter 522 can operate to filter out superfluous look-ups to ensure that data units relating to the six look-ups can be detected in one look-up operation. As such, cache hits and misses for the requested addresses can be determined during one clock cycle (or look up operation), rather than over multiple clock cycles (or over multiple look-up operations). In some embodiments, the functionality of look-up filter 522 can be implemented by executing instructions within a processor unit.

An embodiment of the present invention relates to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention can be implemented using Java, C++, or other object-oriented programming language and development tools. Another embodiment of the invention can be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments.

Although the above descriptions of the various embodiments relate to a cache in graphics pipelines, the discussion is applicable to any type of cache other than found in a GPU.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. An apparatus for filtering accesses to a pool of tags indexed into a cache, said apparatus comprising:
   an input port configured to receive a request to determine whether data units are stored in said cache;
   an output port configured to generate look-ups for said pool of tags; and
   a look-up filter coupled to said input port and said output port, said look-up filter configured to filter out superfluous look-ups for said data units to form filtered look-ups wherein said look-up filter comprises:
   a data unit grouping detector configured to identify multiple data units as identified multiple data units that are indexed by a tag in said pool of tags, wherein said data unit grouping detector comprises comparators for comparing address bits of tags associated with said data units to match the same address bits, wherein a match identifies said tag as a reference for each of said multiple data units, and said comparators include a second quantity of comparators for comparing address bits when said multiple data units are stored in said cache in a sequential order and said second quantity is less than a first quantity associated with arbitrary storage of said data units in said cache, thereby facilitating a reduction of hardware resources for implementing said comparators; and
   a look-up suppressor configured to prevent a superfluous look-up into said pool of tags for a data unit of said identified multiple data units.

2. The apparatus of claim 1 wherein said look-up filter is further configured to filter out said superfluous look-ups for reducing the quantity of look-ups associated with a request to establish a quantity of said filtered look-ups that conforms with a number of look-ups that are applied to said pool of tags per unit of time.

3. The apparatus of claim 2 wherein said quantity of said filtered look-ups is the same or fewer than said number of look-ups, thereby reducing the amount of time to determine whether said data units are stored within said cache than if said request requires multiple units of time.

4. The apparatus of claim 1 wherein said data unit grouping detector is configured to:
   detect a grouping that includes said identified multiple data units, and to
   detect another grouping that includes one or more identified other data units that are indexed by another tag,
   wherein each of said grouping and said another grouping is indexed by a different tag.

5. The apparatus of claim 1 wherein said look-up suppressor is configured to:
   select said tag as a single tag to retrieve said identified multiple data units, and to
   select another tag as a single tag to retrieve said one or more other identified data units,
   whereby the selection of said tag and said another tag as said filtered tags suppresses superfluous tags.

6. The apparatus of claim 1 wherein said comparators include a first quantity of comparators for comparing address bits when said multiple data units are stored in said cache in an arbitrary order.

7. A processor with a graphics pipeline to produce computer-generated images, said processor comprising:
   a frame buffer memory configured to maintain vertex attribute data for vertices;
   a cache memory configured to store said vertex attribute data in cachelines;
   a pool of tags referencing said cachelines; and
   a look-up filter configured to filter out superfluous look-up tags for said vertex attribute data to form filtered look-up tags wherein said look-up filter comprises:
   a data unit grouping detector configured to identify multiple data units as identified multiple data units that are indexed by a tag in said pool of tags, wherein said data unit grouping detector comprises comparators for comparing address bits of tags associated with said data units to match the same address bits, wherein a match identifies said tag as a reference for each of said multiple data units, and said comparators include a second quantity of comparators for comparing address bits when said multiple data units are stored in said cache in a sequential order and said second quantity is less than a first quantity associated with arbitrary storage of said data units in said cache, thereby facilitating a reduction of hardware resources for implementing said comparators; and
   a look-up suppressor configured to prevent a superfluous look-up into said pool of tags for a data unit of said identified multiple data units.

8. The processor of claim 7 wherein said look-up filter is configured to generate an amount of said filtered look-up tags to detect whether said cache is storing units of said vertex attribute data in one look-up operation.

9. The processor of claim 7 further comprising a graphics processing unit ("GPU") including said graphics pipeline and said look-up filter.

10. An apparatus for filtering accesses to a pool of tags indexed into a cache, said apparatus comprising:
    an input port configured to receive a request to determine whether data units are stored in said cache;
    an output port configured to generate look-ups for said pool of tags; and
    a look-up filter coupled to said input port and said output port, said look-u filter configured to filter out superfluous look-ups for said data units to form filtered look-ups, the look-u filter filtering tags associated with a request for data units by determining at least one tag for each subset of addresses in said request, comparing address bits of tags to match the same address bits, and selecting one tag from said at least one tag as one of the filtered tags to reference a corresponding cacheline;
    wherein said look-up filter comprises:
    a data unit grouping detector configured to identify multiple data units as identified multiple data units that are indexed by a tag in said pool of tags; and a look-up suppressor configured to prevent a superfluous look-up into said pool of tags for a data unit of said identified multiple data units; and
    wherein said data unit grouping detector comprises comparators for comparing address bits of tags associated with said data units to match the same address bits, wherein a match identifies said tag as a reference for each of said multiple data units, and said comparators include a second quantity of comparators for comparing address bits when said multiple data units are stored in said cache in a sequential order and said second quantity is less than a first quantity associated with arbitrary storage of said data units in said cache, thereby facilitating a reduction of hardware resources for implementing said comparators.

* * * * *